United States Patent
Hrebicek et al.

(10) Patent No.: US 10,242,024 B1
(45) Date of Patent: Mar. 26, 2019

(54) DYNAMIC REPRIORITIZATION OF CONTENT DOWNLOAD DURING SYNCHRONIZATION

(71) Applicant: EMC IP Holding Company LLC, Hopkinton, MA (US)

(72) Inventors: Ondrej Hrebicek, San Carlos, CA (US); Srin Kumar, Sunnyvale, CA (US); Hironmay Basu, Mountain View, CA (US); Ashwani Verma, Pleasanton, CA (US); Andrew Rondeau, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 94 days.

(21) Appl. No.: 14/743,358

(22) Filed: Jun. 18, 2015

(51) Int. Cl.
*G06F 17/30* (2006.01)
*H04L 29/08* (2006.01)
*G06F 3/0484* (2013.01)

(52) U.S. Cl.
CPC .... *G06F 17/30174* (2013.01); *G06F 3/04842* (2013.01); *H04L 67/1095* (2013.01)

(58) Field of Classification Search
CPC combination set(s) only.
See application file for complete search history.

(56) References Cited

U.S. PATENT DOCUMENTS

| 7,024,491 B1 | 4/2006 | Hanmann |
| 8,825,597 B1 | 9/2014 | Houston |
| 2003/0046415 A1* | 3/2003 | Kaijyu ............... H04L 29/06 709/230 |
| 2003/0074323 A1 | 4/2003 | Catan |
| 2003/0229899 A1 | 12/2003 | Thompson |
| 2005/0033760 A1* | 2/2005 | Fuller ............ G06F 17/30247 |
| 2007/0186106 A1 | 8/2007 | Ting |
| 2007/0226368 A1* | 9/2007 | Strickland ........... G06Q 30/02 709/243 |
| 2008/0005195 A1 | 1/2008 | Li |
| 2009/0157802 A1 | 6/2009 | Kang |
| 2010/0057924 A1* | 3/2010 | Rauber .............. G06Q 30/00 709/229 |
| 2010/0113072 A1 | 5/2010 | Gibson |
| 2011/0218963 A1 | 9/2011 | Dun |

(Continued)

OTHER PUBLICATIONS

EMC Corporation—White Paper. "Secure, Enterprise File Sync and Share with EMC Syncplicity Utilizing EMC Isilon, EMC Atmos, and EMC VNX". Aug. 2014.

*Primary Examiner* — Etienne P Leroux
(74) *Attorney, Agent, or Firm* — Van Pelt, Yi & James LLP

(57) ABSTRACT

Techniques to perform event-based synchronization of data are disclosed. In various embodiments, an indication is received, during the course of performing a synchronization event-based synchronization with a synchronization client, that a user of the synchronization client has provided an input associated with a request to access a file or other object the changes to which have not yet been downloaded completely to the synchronization client. Download of the changes to the file other object with respect to which the input associated with a request to access is associated is reprioritized, to enable the synchronization client to provide access to the file or other object more quickly than would have been possible without the reprioritization.

17 Claims, 10 Drawing Sheets

(56) References Cited

U.S. PATENT DOCUMENTS

| | | |
|---|---|---|
| 2012/0310880 A1 | 12/2012 | Giampaolo |
| 2014/0032759 A1 | 1/2014 | Barton |
| 2014/0059185 A1 | 2/2014 | Siripurapu |
| 2014/0067997 A1 | 3/2014 | Saabas |
| 2014/0195485 A1 | 7/2014 | Dorman |
| 2014/0287818 A1 | 9/2014 | Chan |
| 2015/0120662 A1 | 4/2015 | Dai |
| 2015/0339727 A1 | 11/2015 | Yi |
| 2016/0294916 A1 | 10/2016 | Daher |

* cited by examiner

600

| Event # | Object | Event type | Time | Client | Event details |
|---|---|---|---|---|---|
| 1 | | | | | |
| 2 | | | | | |
| 3 | | | | | |
| 4 | | | | | |
| 5 | | | | | |
| ⋮ | | | | | |
| n | | | | | |

FIG. 6

DYNAMIC REPRIORITIZATION OF CONTENT DOWNLOAD DURING SYNCHRONIZATION

BACKGROUND OF THE INVENTION

File sharing systems and services have been provided to maintain synchronization among a plurality of endpoints at which a synchronized folder and/or its contents (e.g., files) may be stored. Typically, synchronization has been performed via processing done primarily on the server side, enabling synchronization to be provided across disparate client devices and systems using relatively minimal client side software.

For example, in prior approaches, when an opportunity to synchronize a folder or other synchronization set as stored on a client device or system arose, e.g., the client checked in with a synchronization server, the server would determine which changes the client device or system needed to send to the server, and which changes made elsewhere needed to be downloaded to the client device or system. However, at scale, such a server centric approach may strain server side resources, particularly for large synchronization sets and/or for system that must synchronize a large number of synchronization sets of files (e.g., folders) across many client devices/systems and/or end users.

File synchronization may not always be completed by the time a user would like to access a file or other object and/or information that is being synchronized.

BRIEF DESCRIPTION OF THE DRAWINGS

Various embodiments of the invention are disclosed in the following detailed description and the accompanying drawings.

FIG. 6 is a block diagram illustrating an example of a data structure to store a synchronization event stream in an embodiment of a file sharing system.

DETAILED DESCRIPTION

Figure 1:
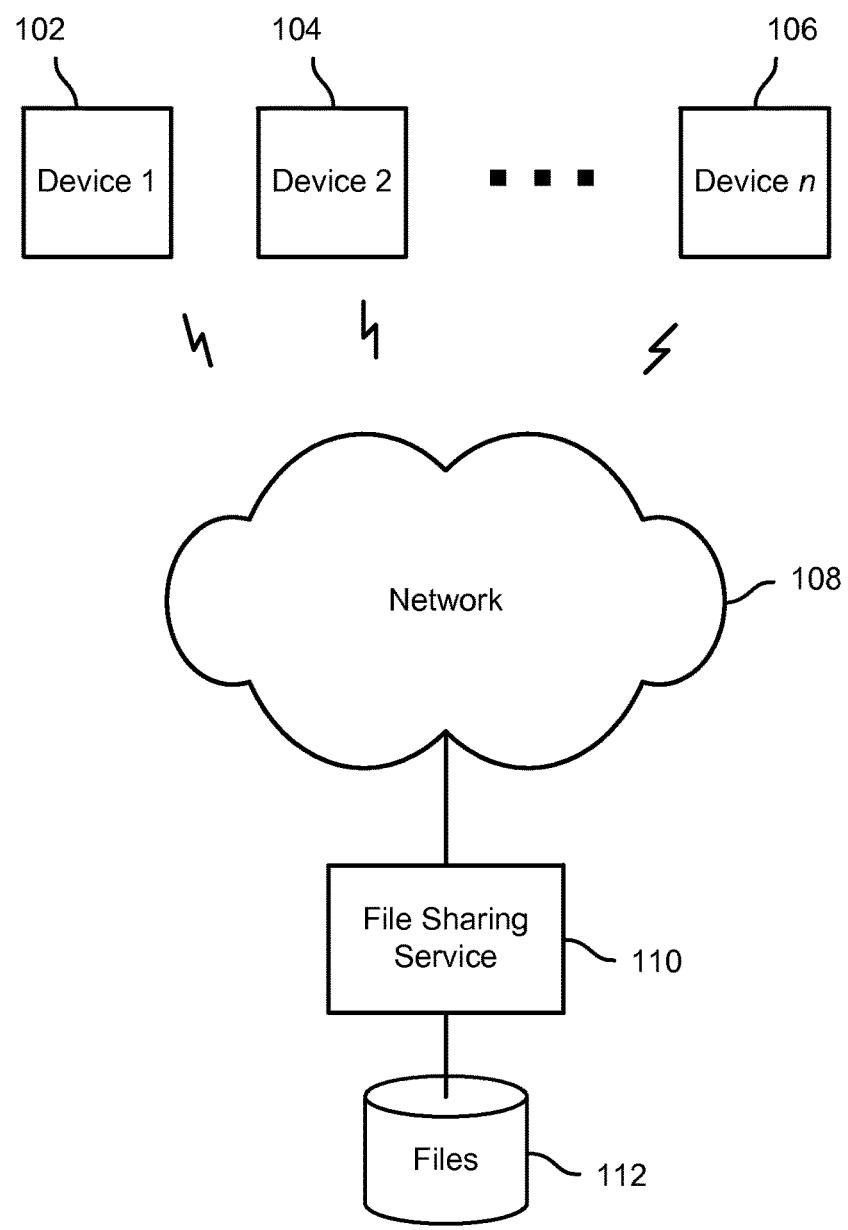
FIG. 1 is a block diagram illustrating an example embodiment of a file syncing and sharing system and associated client devices.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic re-prioritization of content download during an event-based synchronization is disclosed. In various embodiments, a synchronization server may be configured to receive changes to files, folders, or metadata associated with a synchronization set, and to propagate such changes by adding to a synchronization event stream synchronization events that reflect such changes. Synchronization clients may be configured to check the synchronization stream for new events that have not yet been downloaded by the client, and to request download of events needed by the client to perform synchronization processing with respect to files, folders, and/or metadata as stored at the client. In various embodiments, the synchronization server downloads first event metadata that may be sufficient to enable the requesting client to present an updated view of files and/or folders, prior to underlying file or other content data being (fully) downloaded. In some embodiments, a user input indicating a desire to access an object that has been changed but for which the changes have not been downloaded (fully) may result in the client sending to the server and indication to which the server may be responsive to reprioritize the download of remaining synchronization data, e.g., to give priority to change data associated with the object(s) in which interest has been indicated.

FIG. 1 is a block diagram illustrating an example embodiment of a file syncing and sharing system and associated client devices. In the example shown, a plurality of client devices, represented in FIG. 1 by devices 102, 104, and 106, connect via a network 108 to a file sharing service 110 configured to provide managed access, via share operations defined by users, to files stored in a file storage system and/or device 112. In some embodiments, client devices such as devices 102, 104, and 106 each have installed thereon a client application or other client side code configured to provide access to services provided by the file sharing service 110. Examples of such services may include, in various embodiments, operations to share a file and/or folder with one or more other specific users and/or groups of users, and operations to view and/or access files and folders that have been shared by other users with a user of the mobile device. In some embodiments, file sharing service 110 comprises the EMC® Syncplicity® file sharing service.

Figure 2:
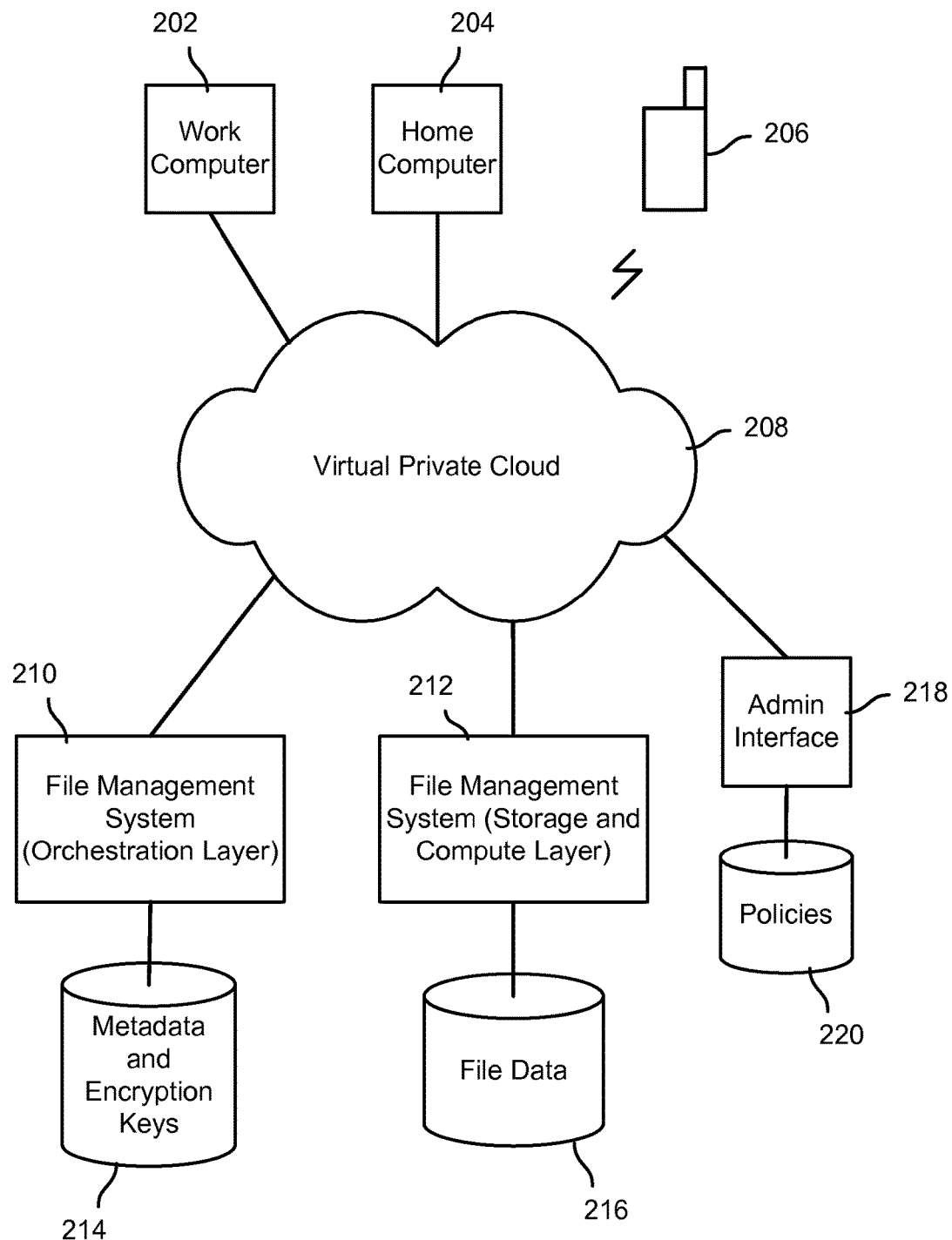
FIG. 2 is a block diagram illustrating an embodiment of a file management system.

FIG. 2 is a block diagram illustrating an embodiment of a file management system. In the example shown, content that is created, modified, deleted, etc. by one or more users of computers 102 and 104 and mobile device 106 is managed as part of a virtual private cloud 208 by a file management system that includes an orchestration layer 210 and a storage and compute layer 212. In various embodiments, a synchronization point instance may be created to manage files across disparate storage systems, including without limitation the computers 102 and 104, mobile device 106, as well as file servers and web/cloud based solutions. The orchestration layer 210 uses metadata stored and (optionally) encryption keys stored in a metadata and encryption key store 214 to manage files included in a synchronization point. Files are stored and managed "in place" at the various endpoints at which the user(s) of the synchronization point have configured them to reside. Each endpoint has a master copy of each file it is configured to store, and the locally stored file is synchronized to propagate to other endpoints changes that are made to the local copy and to update the local copy to reflect changes made at other endpoints. At file creation and/or as updates are made at various endpoints, file content data and/or changes thereto are uploaded to the storage and compute layer 212, which performs bulk data transfers and storage, and associated processing such as encryption and compression. Storage and compute layer 212 stores file data in a file data store 216, which in some embodiments may include any backend storage suitable to store large amounts of data. Using an administrative interface 218, such as a web-based interface, IT administrators can define and store in a policy store 220, and to configure the file management system to apply and enforce, file management policies, including in various embodiments and without limitation one or more of retention policies, access restrictions (e.g., restricting access to enterprise data and/or selected data depending on user/device location), security policies to limit sharing to authorized enterprise users, etc.

Figure 3:
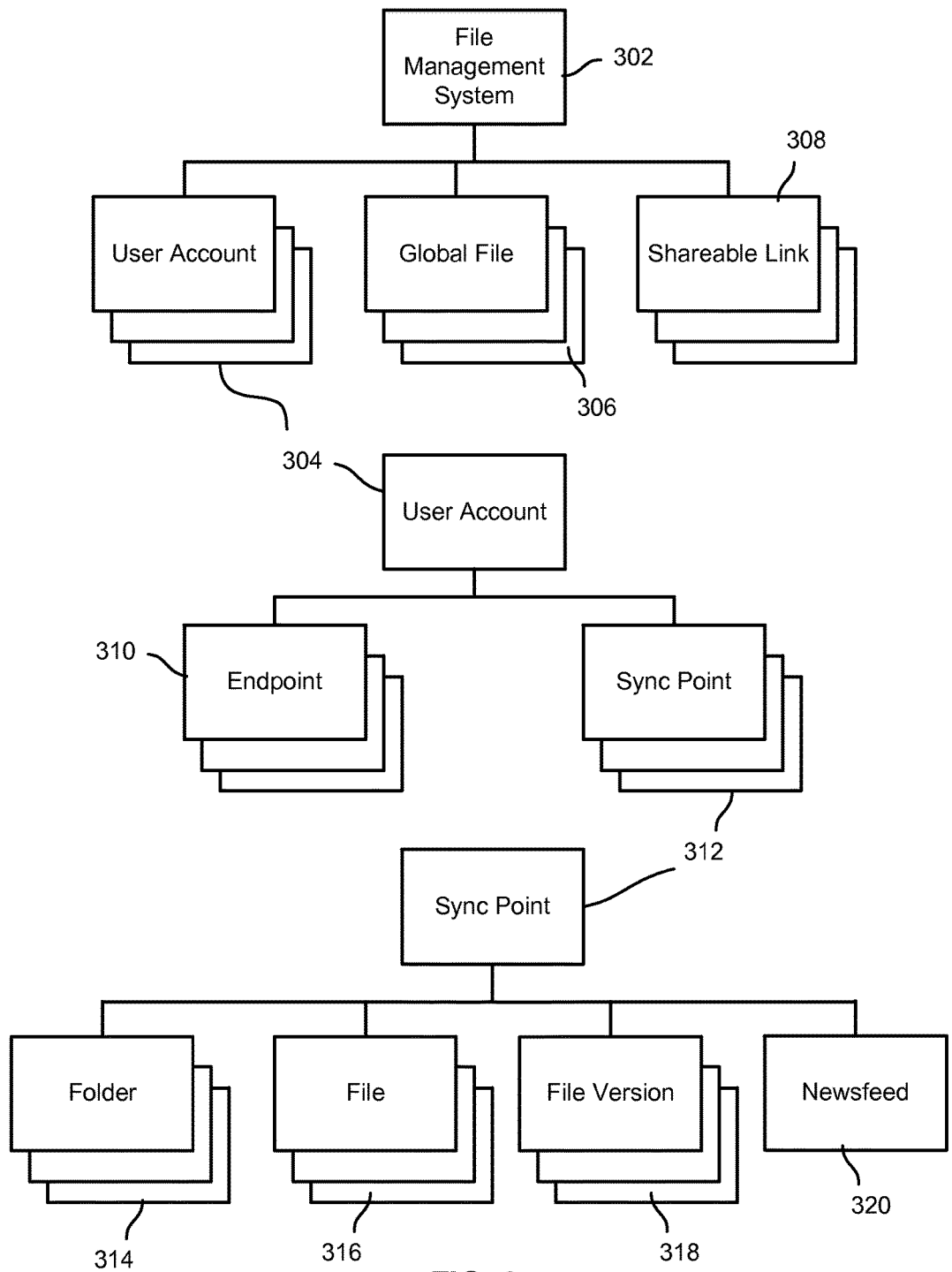
FIG. 3 is a block diagram illustrating an embodiment of a set of data structures representing entities comprising a synchronized file management system.

FIG. 3 is a block diagram illustrating an embodiment of a set of data structures representing entities comprising a synchronized file management system. In the example shown, the file management system 302 may include a plurality of user accounts 304, a plurality of global files 306, and a plurality of shareable links 308. Each user account 304 may have associated therewith one or more endpoints 310 and one or more synchronization points 312. In some embodiments, shareable lines 308 may be associated with user accounts 304. Each synchronization point 312 may include one or more folders (or subfolders) 314, a plurality of files 316, each file having one or more file versions 318, and/or a newsfeed 320 to propagate events and other information among nodes included in the synchronization point instance. In various embodiments, tables or other data structures may be created and stored to track and manage data values representing the entities shown in FIG. 3.

Event-based synchronization of objects stored in a multi-master, non-transaction file management system is disclosed. In various embodiments, a synchronization server propagates file management system object changes to endpoints associated with a synchronization point (e.g., a shared folder) with which the changed object is associated at least in part by generating and maintaining synchronization event stream. Client code running on the respective endpoints is configured to check the synchronization event stream and to use information in events comprising the stream to synchronize files, folders, and metadata as stored on the endpoint as required to become and remain synchronized with the global/authoritative state of the objects and metadata comprising the synchronization point.

Figure 4:
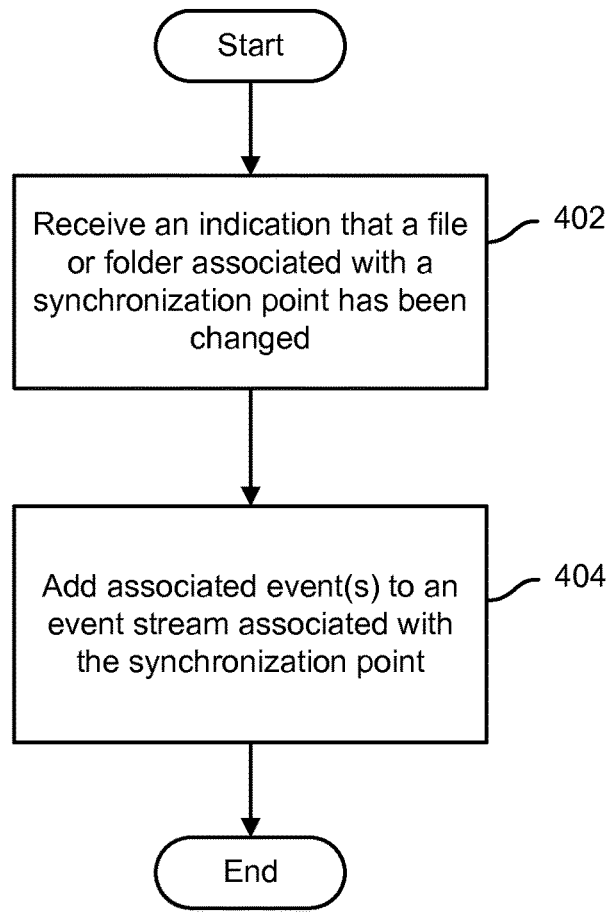
FIG. 4 is a flow chart illustrating an embodiment of a process to provide an event stream associated with a synchronization point.

FIG. 4 is a flow chart illustrating an embodiment of a process to provide an event stream associated with a synchronization point. In various embodiments, the process of FIG. 4 may be performed by a synchronization server, such as file syncing and sharing service 110 of FIG. 1 or file management system servers 210 and/or 212 of FIG. 2. In the example shown, an indication is received that a file or folder (or other object or information) associated with a synchronization point has been changed, e.g., at one of a plurality of endpoints (client systems and/or devices) associated with the synchronization point (402). For example, client code running on the endpoint may have provided the indication, e.g., in response to the object having been saved in modified form at the endpoint. A corresponding synchronization event is created and added to an event stream associated with the synchronization point (404). For example, a list, table, or other data structure may be updated to include the synchronization event. In various embodiments, synchronization events may be identified by a sequential number and/or other unique identifier, such as a monotonically increasing sequence number. In various embodiments, the event sequence numbers and/or other sequential identifiers may be used by client software to determine whether new events have been added to the event stream since that client last downloaded events, and if so which ones need to be downloaded by that client.

Figure 5:
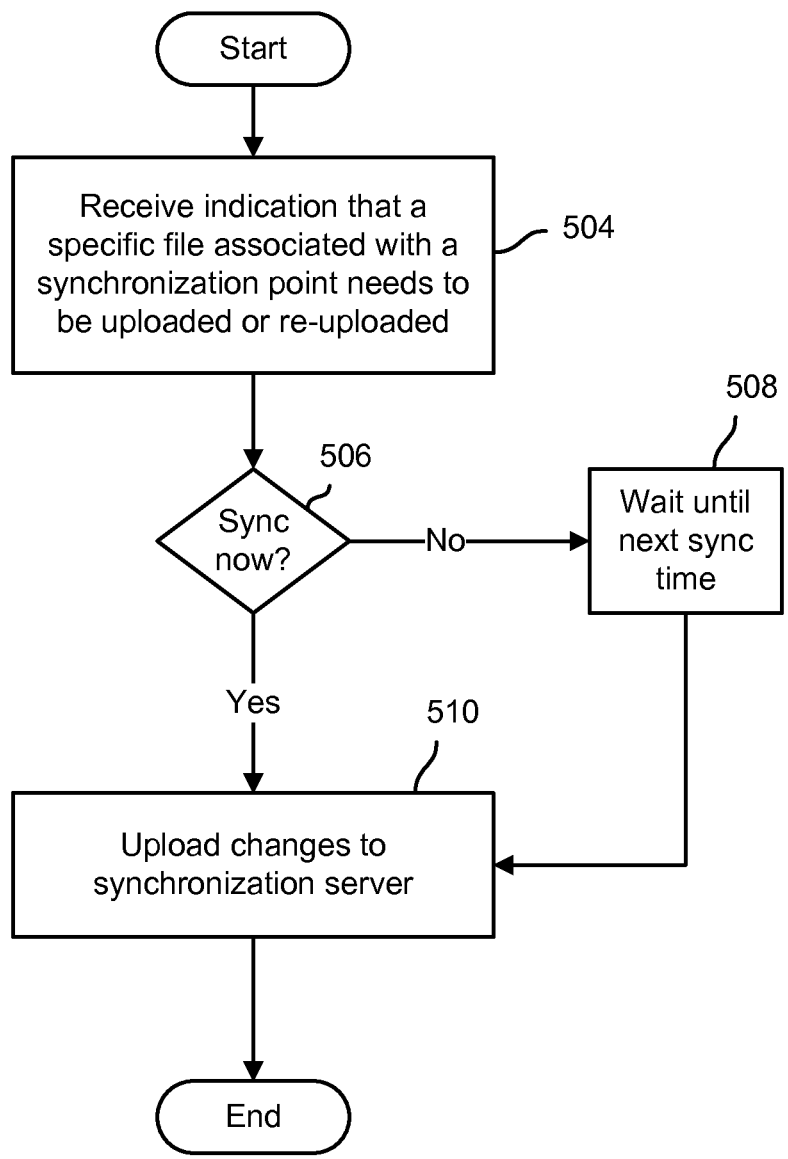
FIG. 5 is a flow chart illustrating an embodiment of a process to upload file system objects at an endpoint.

FIG. 5 is a flow chart illustrating an embodiment of a process to upload file system objects at an endpoint. In various embodiments, the process of FIG. 5 may be performed by client side code, such as a synchronization client application and/or script, running on a client system or device associated with a synchronization endpoint, such as devices 102, 104, 106 of FIG. 1 and/or clients 202, 204, 206 of FIG. 2. In some embodiments, client side execution of the process of FIG. 5 results in the indication of step 402 of FIG. 4 being received at the server side. In the example shown in FIG. 5, a server informs the client that a specific file, which is known to reside on the client device, needs to be uploaded (504). This can happen if, for example, the file was found to be corrupt on the server. If the client application/code is configured to immediately synchronize the file (506), and/or upon the next time and opportunity that the client side code is configured to synchronize files at the client (508), the files at the client are uploaded to the synchronization server (510).

FIG. 6 is a block diagram illustrating an example of a data structure to store a synchronization event stream in an embodiment of a file sharing system. In various embodiments, data structures such as the event stream table 600 of FIG. 6 may be used to store a synchronization event stream generated and maintained by a synchronization server, as in the process of FIG. 4. In the example shown, synchronization event stream table 600 includes for each sequentially numbered synchronization event in the stream a corresponding row in which the following data values are stored, each in a corresponding column of table 600: event sequence number; object (e.g., file) affected; event type (e.g., file contents modified, file/folder name changed, etc.); a time associated with the event (e.g., when the change occurred, was reported, and/or associated event was added to the stream); a client device/system/endpoint with which the event is associated (e.g., endpoint at which change was made and/or from which change was reported); and event details (e.g., name-value pairs for modified attributes, pointers to object content data as modified, etc.).

In various embodiments, a client code running on an endpoint may be configured to use data stored in synchronization event stream table 600, as stored at the synchronization server, to determine whether events have been added since a last time the client downloaded events, and if so which ones. For example, a synchronization client may query the synchronization server to determine a last used (added) event sequence number. If the number is greater than the last event sequence number processed by the client, in some embodiments the client may submit additional queries to determine which, if any, of the newly-added events should be requested for download by and to that client.

Figure 7:
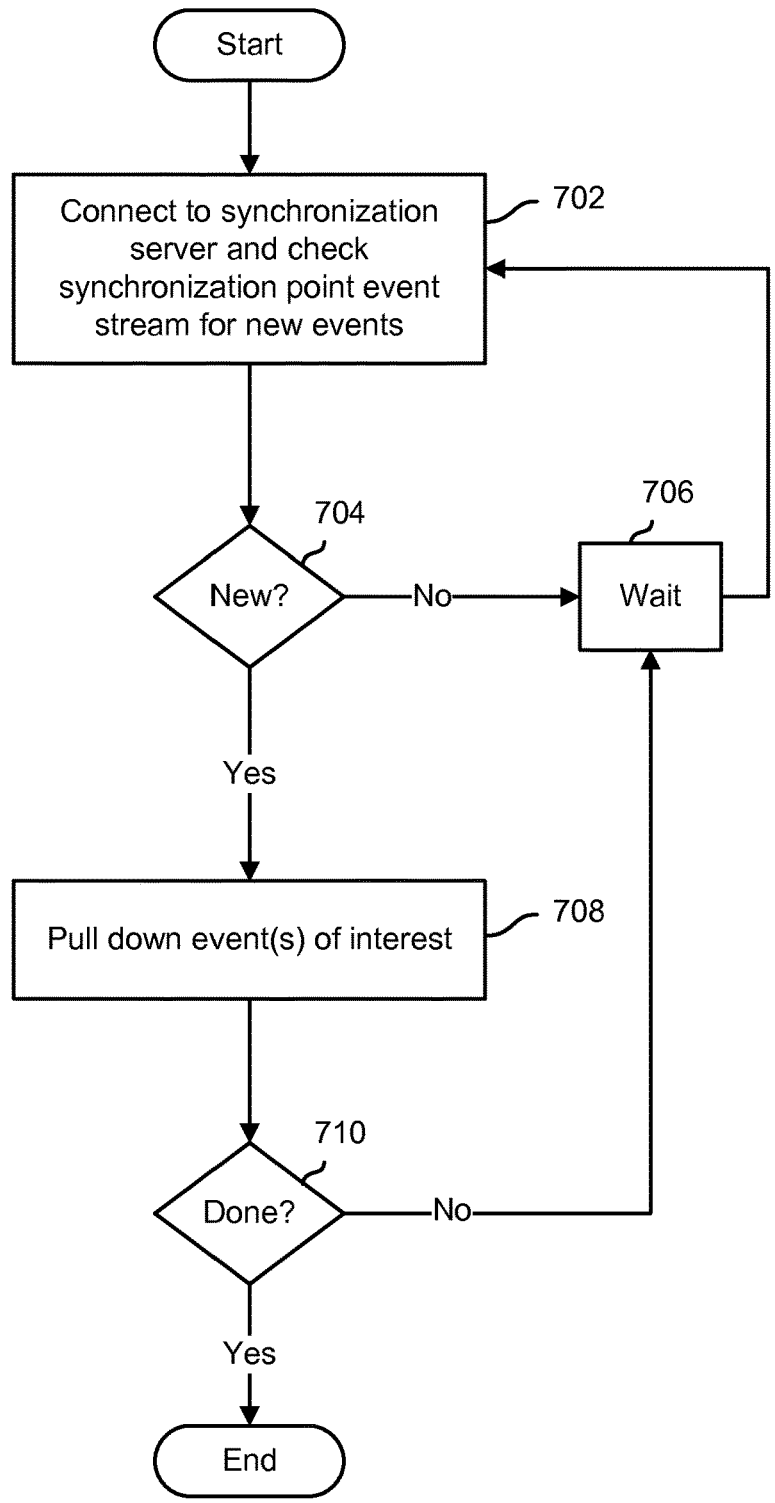
FIG. 7 is a flow chart illustrating an embodiment of a process to download synchronization events to an endpoint.

FIG. 7 is a flow chart illustrating an embodiment of a process to download synchronization events to an endpoint. In various embodiments, a synchronization client application or other client side synchronization code may be configured to perform the process of FIG. 7, e.g., client code running on client systems and/or devices, such as devices 102, 104, 106 of FIG. 1 and/or clients 202, 204, 206 of FIG. 2. In the example shown, the client side code connects to the synchronization server and checks to determine if the synchronization event stream associated with a synchronization point with respect to which the client is a participating endpoint includes any synchronization events that were added since a last time the client checked for and/or downloaded events in the stream (702). If there are no new events (704), the client waits a prescribed interval (e.g., admin user configurable, hard coded, dynamically determined based on conditions, location, etc.) (706) and checks again (702). If there are events in the synchronization event stream that the client has not yet downloaded (704), the client identifies and pulls down (e.g., requests from the server) events of interest to that client (708). For example, the client may request only a subset of events relating to synchronization point objects with respect to which the client has been configured to maintain synchronization. Once new events have been downloaded (710), the client will wait a prescribed interval and/or for occurrence of a prescribed event (706) before checking again (702). The process continues until done (710), e.g., the client is no longer an endpoint participating in the synchronization point.

Dynamic reprioritization of synchronization data download in an event-based synchronization system is disclosed.

Figure 8:
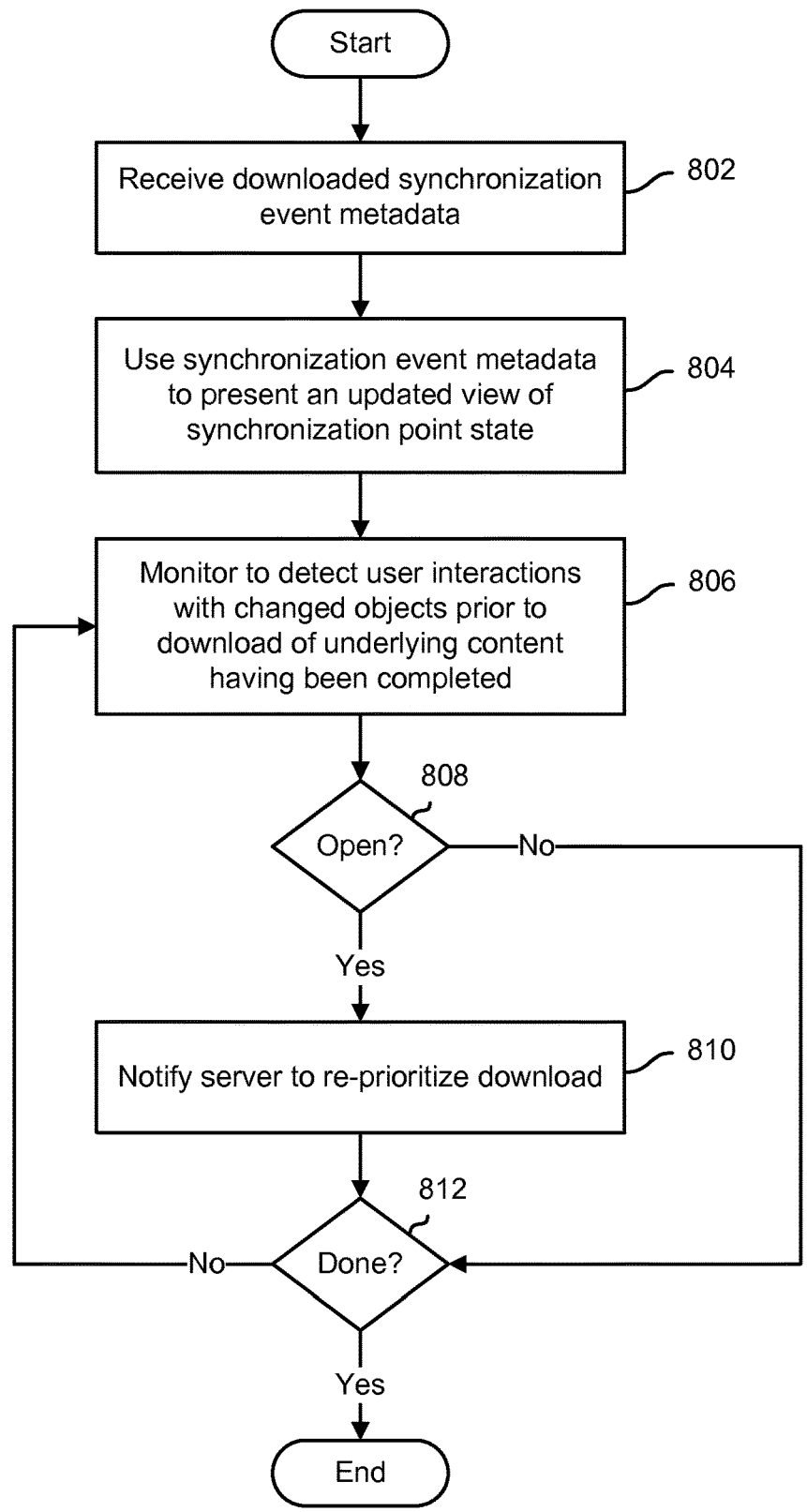
FIG. 8 is a flow chart illustrating an embodiment of a process to download file synchronization data.

FIG. 8 is a flow chart illustrating an embodiment of a process to download file synchronization data. In various embodiments, a synchronization client application or other client side synchronization code may be configured to perform the process of FIG. 8, e.g., client code running on client systems and/or devices, such as devices 102, 104, 106 of FIG. 1 and/or clients 202, 204, 206 of FIG. 2. In the example shown, downloaded synchronization event metadata is received (802). In various embodiments, the synchronization server may download first, and separately from new or changed file content data, metadata sufficient to display an accurate and updated view of a folder and/or its contents, for example. The received synchronization event metadata is used at the client to present such an updated view of relevant synchronization point state, e.g., a folder and its contents, such as subfolders and files (804). At the client system, user interaction with objects that have associated changes that have not yet been downloaded (fully) are monitored (806). If a user provides an input to access such a file or other object (808) prior to download of associated content data being completed, a notification is sent to the synchronization server to prompt the server to reprioritize the download of synchronization event data to give priority to file or other content associated with the object the user is attempting to access (810). In various embodiments, the action of making an explicit request to the synchronization server to download a file selected by the user, is sufficient to infer the interest of the user. Client interactions, if any, with the presented view of file/folder objects that the modified content of which has not yet been downloaded (fully) continue to be monitored until all synchronization event data has been downloaded (812).

Figure 9:
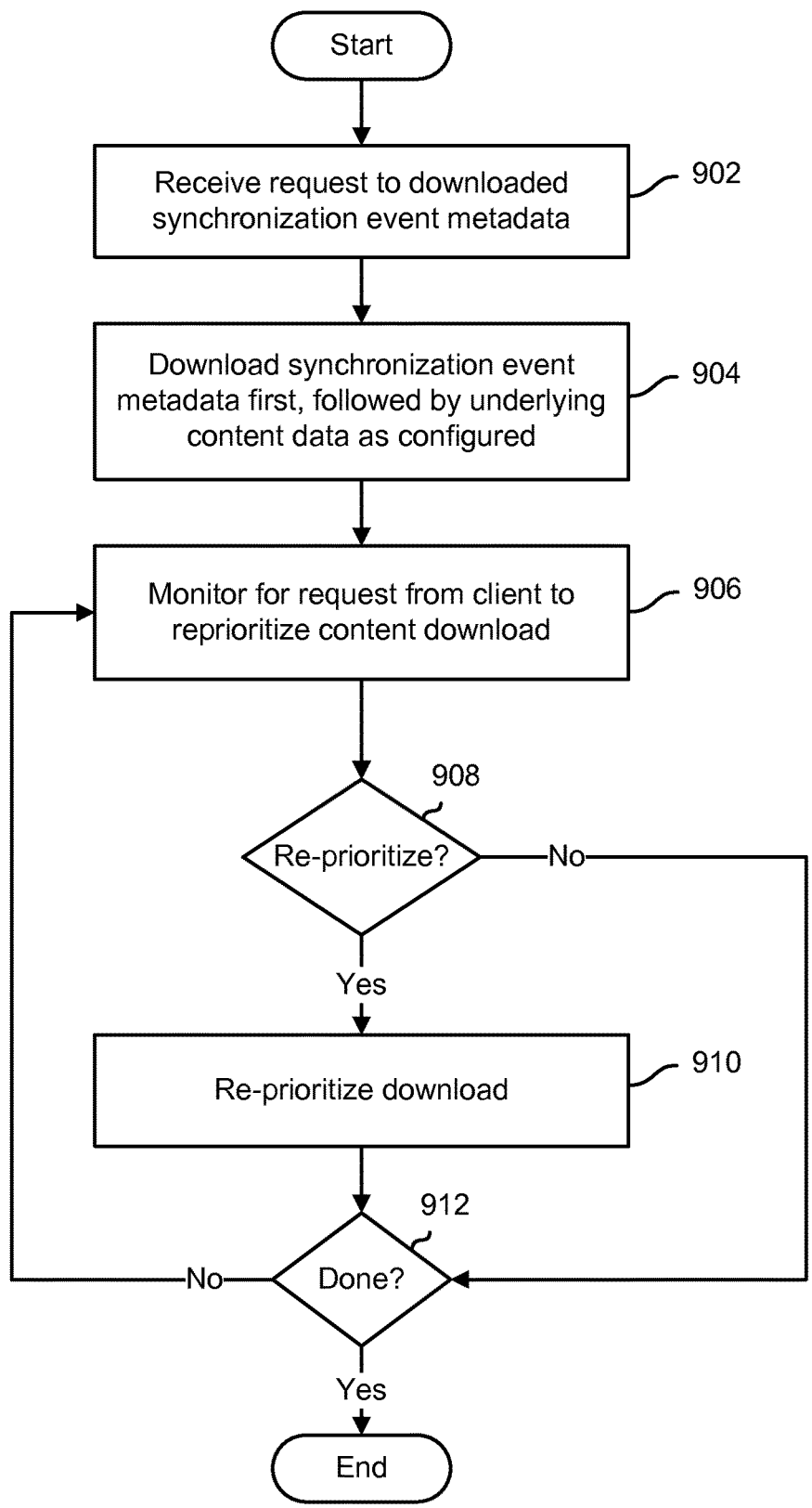
FIG. 9 is a flow chart illustrating an embodiment of a process to download file synchronization data.

FIG. 9 is a flow chart illustrating an embodiment of a process to download file synchronization data. In various embodiments, the process of FIG. 9 may be performed by a synchronization server, such as file sharing service 110 of FIG. 1 or file management system servers 210 and/or 212 of FIG. 2. In the example shown, a request to download synchronization events from a synchronization event stream is received (902). Synchronization event related metadata is downloaded first, followed by the underlying content data (904). For example, if ten events are requested to be downloaded, in some embodiments metadata associated with all ten events at least initially may be downloaded first, followed by the underlying content data, such as modified file contents. In some embodiments, the metadata is or may be sufficient to enable the requesting client to present an updated view of a folder or other set of objects, even before the modifications to content that may be reflected by such metadata have not yet been downloaded. The server monitors for receipt of any indication from the client that the order of synchronization event data download should be changed (906). If an indication is received at the server that the user has provided an input associated with an attempt to access an object (e.g., file) the modified content data of which has not yet been downloaded (fully) (908), then the synchronization server reprioritizes the download of synchronization event data to provide to the client sooner, e.g., immediately, the content data that may be required to fulfill the access request (910). Monitoring and reprioritization of download, if/as needed, continue, e.g., until synchronization is complete (912).

In some embodiments, techniques disclosed herein may be applied across different synchronization clients (e.g., devices) of a specific user. For example a user may have a Desktop client, an iPhone client and an iPad Client. If the user has opened a file on the Desktop client during office hours for reading this could have triggered a download by which the Server would learn and ensure the same document is synced, e.g., in an automated and/or prioritized basis, onto the user's iPhone and iPad client, allowing the user to continue his/her reading in the evening or night.

Figure 10:
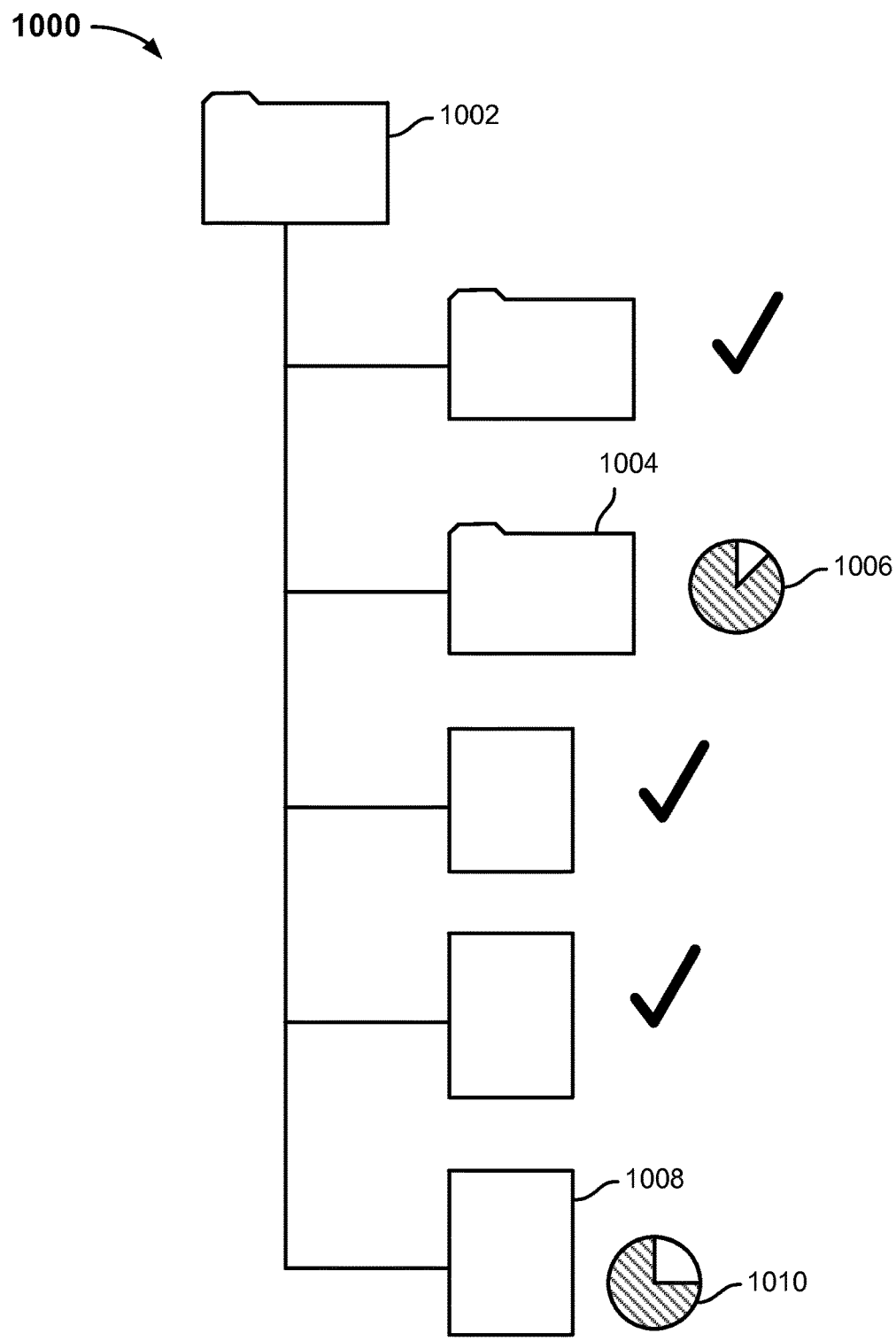
FIG. 10 is a block diagram illustrating an example of a client side user interface in an embodiment of a file management/sharing/synchronization system.

FIG. 10 is a block diagram illustrating an example of a client side user interface in an embodiment of a file management/sharing/synchronization system. In various embodiments, a synchronization client application or other client side synchronization code may be configured to display the user interface of FIG. 10 while event-based synchronization is in process, e.g., client code running on client systems and/or devices, such as devices 102, 104, 106 of FIG. 1 and/or clients 202, 204, 206 of FIG. 2. In the example shown, the user interface 1000 includes a representation of a synchronization folder 1002 and associated subfolders and files. The synchronization folder 1002 includes a subfolder and two files with respect to which the download of synchronization event data has been completed in this example, as indicated by the "check mark" displayed to the side of the topmost subfolder and the upper two files shown. In addition, synchronization event metadata has been downloaded with respect to subfolder 1004 and file 1008, but changed content data has not yet been downloaded (fully), as indicated by the download progress indicators/widgets 1006 and 1010, respectively. In various embodiments, if a user were to click on the representation of either subfolder 1004 or file 1008, an indication would be sent to the synchronization server in response to which the synchronization server would, if possible, reprioritize the download of remaining synchronization event data, e.g., to give priority to the download of content data associated with the subfolder, file, or other object in which the user has expressed interest.

In various embodiments, downloading synchronization metadata first enables an updated view to of synchronization point state to be presented quickly at a client device/system. Dynamic reprioritization of the download of modified file or other content data based on a user input indicating a desire to access such data may enable access to be provided more quickly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of synchronizing data, comprising:
receiving, by one or more processors connected to a synchronization client via a network, an indication, during the course of performing a synchronization event-based synchronization with the synchronization client, that a user of the synchronization client has provided an input associated with a request to access a file or other object the changes to which have not yet been downloaded completely to the synchronization client from a synchronization server; and
reprioritizing, by one or more processors, download of the changes to the file or other object with respect to which the input associated with a request to access is associated, to enable the synchronization client to provide access to the file or other object more quickly than would have been possible without the reprioritization,
wherein the synchronization server is configured to download first to the synchronization client synchronization event metadata sufficient to enable the synchronization client to present a view of a synchronized state of the file or other object prior to the changes being downloaded to the synchronization client.

2. The method of claim 1, wherein the user input comprises a selection of the file or other object in a user interface displayed by the synchronization client.

3. The method of claim 1, wherein reprioritization includes download the file or other object changes prior to complete the download of synchronization event metadata associated with one or more synchronization events.

4. The method of claim 1, wherein reprioritization includes download the file or other object changes prior to downloading change data associated with one or more other files or other objects previously scheduled to be downloaded first.

5. The method of claim 1, wherein synchronization client is configured to monitor user interactions during synchronization and to send an indication to the synchronization server in the event the user provides an input associated with a request to access a file or other object the content data of which has not yet been synchronized.

6. The method of claim 1, further comprising:
providing, by one or more processors, to the synchronization client the download of the changes to the file or other object.

7. The method of claim 1, further comprising:
synchronizing, by one or more processors, the changes to the file or other object with the synchronization client based at least in part on the reprioritized download.

8. A system to synchronize data, comprising:
a communication interface; and
a processor coupled to the communication interface and configured to:
receive via the communication interface, during the course of performing a synchronization event-based synchronization with a synchronization client, an indication that a user of the synchronization client has provided an input associated with a request to access a file or other object the changes to which have not yet been downloaded completely to the synchronization client, wherein the indication is received from the synchronization client via a network from a synchronization server; and
reprioritize download of the changes to the file or other object with respect to which the input associated with a request to access is associated, to enable the synchronization client to provide access to the file or other object more quickly than would have been possible without the reprioritization,
wherein the synchronization server is configured to download first to the synchronization client synchronization event metadata sufficient to enable the synchronization client to present a view of a synchronized state of the file or other object prior to the changes being downloaded to the synchronization client.

9. The system of claim 8, wherein the user input comprises a selection of the file or other object in a user interface displayed by the synchronization client.

10. The system of claim 8, wherein reprioritization includes download the file or other object changes prior to complete the download of synchronization event metadata associated with one or more synchronization events.

11. The system of claim 8, wherein reprioritization includes download the file or other object changes prior to downloading change data associated with one or more other files or other objects previously scheduled to be downloaded first.

12. The system of claim 8, wherein synchronization client is configured to monitor user interactions during synchronization and to send an indication to the synchronization server in the event the user provides an input associated with a request to access a file or other object the content data of which has not yet been synchronized.

13. A computer program product to synchronize data, the computer program product being embodied in a non-transitory computer readable storage medium and comprising computer instructions for:
receiving an indication, during the course of performing a synchronization event-based synchronization with a synchronization client, that a user of the synchronization client has provided an input associated with a request to access a file or other object the changes to which have not yet been downloaded completely to the synchronization client, wherein the indication is received from the synchronization client via a network from a synchronization server; and reprioritizing download of the changes to the file or other object with respect to which the input associated with a request to access is associated, to enable the synchronization client to provide access to the file or other object more quickly than would have been possible without the reprioritization, wherein the synchronization server is configured to download first to the synchronization client synchronization event metadata sufficient to enable the synchronization client to present a view of a synchronized state of the file or other object prior to the changes being downloaded to the synchronization client.

14. The computer program product of claim 13, wherein the user input comprises a selection of the file or other object in a user interface displayed by the synchronization client.

15. The computer program product of claim 13, wherein reprioritization includes download the file or other object changes prior to complete the download of synchronization event metadata associated with one or more synchronization events.

16. The computer program product of claim 13, wherein reprioritization includes download the file or other object changes prior to downloading change data associated with one or more other files or other objects previously scheduled to be downloaded first.

17. The computer program product of claim 13, wherein synchronization client is configured to monitor user interactions during synchronization and to send an indication to the synchronization server in the event the user provides an input associated with a request to access a file or other object the content data of which has not yet been synchronized.

* * * * *